United States Patent
Tewari

(10) Patent No.: US 7,834,751 B2
(45) Date of Patent: Nov. 16, 2010

(54) METHOD AND APPARATUS FOR VEHICLE BRAKE LIGHT CONTROL

(75) Inventor: Asim Tewari, Bangalore (IN)

(73) Assignee: GM Global Technology Operations, Inc., Detroit, MI (US)

( * ) Notice: Subject to any disclaimer, the term of this patent is extended or adjusted under 35 U.S.C. 154(b) by 315 days.

(21) Appl. No.: 12/051,312

(22) Filed: Mar. 19, 2008

(65) Prior Publication Data

US 2008/0238648 A1 Oct. 2, 2008

Related U.S. Application Data

(60) Provisional application No. 60/908,193, filed on Mar. 27, 2007.

(51) Int. Cl.
*B60Q 1/26* (2006.01)
(52) U.S. Cl. .............. 340/469; 340/463; 340/468; 340/479
(58) Field of Classification Search .......... 340/469, 340/463, 464, 466, 467, 468, 479
See application file for complete search history.

(56) References Cited

U.S. PATENT DOCUMENTS

| | | | | |
|---|---|---|---|---|
| 5,150,098 A * | 9/1992 | Rakow | ................ | 340/479 |
| 5,231,373 A * | 7/1993 | Freeman et al. | ............. | 340/469 |
| 5,481,243 A * | 1/1996 | Lurie et al. | ................ | 340/467 |
| 5,594,416 A * | 1/1997 | Gerhaher | ................ | 340/467 |
| 6,133,852 A * | 10/2000 | Tonkin | ................ | 340/903 |
| 6,150,933 A * | 11/2000 | Matsumoto | ................ | 340/479 |
| 6,268,792 B1 * | 7/2001 | Newton | ................ | 340/467 |
| 6,850,156 B2 * | 2/2005 | Bloomfield et al. | ......... | 340/467 |
| 6,870,474 B1 * | 3/2005 | Brothers | ................ | 340/468 |
| 7,190,260 B2 * | 3/2007 | Rast | ................ | 340/479 |
| 2007/0241874 A1 * | 10/2007 | Okpysh et al. | ............. | 340/479 |

OTHER PUBLICATIONS (Anonymous), See the E-Class in a New Light, Daimler South East Asia Ltd. Website, Sep. 1, 2006, Singapore.
The above reference is available as of Mar. 20, 2008 at the following internet address: http://sea.daimlerchrysler.com/dc_sea/0-380-185472-1-635756-1-0-0-0-0-0-3925-184542-0-0-0-0-0-0-0.html.

* cited by examiner

*Primary Examiner*—Toan N Pham

(57) ABSTRACT

A method for controlling the brake lights of a vehicle includes determining vehicle deceleration potential and modulating brake light activation based upon the vehicle deceleration potential, the modulating comprising changing at least one of brake light intensity and flashing of the brake lights.

17 Claims, 1 Drawing Sheet

US 7,834,751 B2

METHOD AND APPARATUS FOR VEHICLE BRAKE LIGHT CONTROL

CROSS REFERENCE TO RELATED APPLICATIONS

This application claims the benefit of U.S. Provisional Application No. 60/908,193 filed on Mar. 27, 2007 which is hereby incorporated herein by reference.

TECHNICAL FIELD

This disclosure is related to vehicular brake light control.

BACKGROUND

Vehicle manufacturers are continually researching new ways to improve vehicle operator situational awareness on the roadway, for example through improved forward lighting systems, various environmental sensing systems including radar, infrared and vision systems, and vehicle brake light systems. Forward lighting systems may now be found in production vehicles which have a daytime running mode wherein the forward lighting is automatically operated at reduced intensity during certain conditions to improve the vehicle's visibility to other vehicle operators. Similarly, vehicle brake light systems may now be found which include center high mounted stop lamps or CHMSL which are often visible through the windshield and backglass of preceding vehicles which gives other vehicle operators an earlier indication of traffic conditions up ahead than otherwise available by relying solely upon the brake lights of an immediately preceding vehicle. And, the more recent use of light emitting diode (LED) brake lights provides a more instantaneous indication of brake pedal activation than is available with filament-type bulbs. Different schemes are known for indicating brake lights braking events keyed to brake pedal depression, including solid light activation and flashing light activation.

Known vehicle brake light control systems rely on the cooperative arrangement of an electrical brake switch and brake pedal linkage. The brake pedal linkage keeps the brake switch in an open state when the brake pedal remains in a rest or undepressed position. At anytime the brake pedal is depressed, regardless of how far or with how much pressure, the brake switch is closed. The brake switch provides an electrical input to a computer based control which monitors the brake switch state and turns on the vehicle brake lights at anytime the switch is closed and turns off the brake lights at anytime the brake switch is open. Additionally, various forms of vehicle speed and vehicle acceleration data are widely tracked and are known to be used to activate brake light systems.

Known vehicle brake light control systems convey no information to other vehicles on the roadway of the braking vehicle's velocity, nor do they convey varying degrees of information related to the rate of deceleration of the vehicle. Such systems, for instance, do not convey any information relative to actual vehicle deceleration including, for example, more aggressive decelerations as can be invoked by down-shifting, throttle pedal releases coupled with performance-type automatic transmission calibrations, or parking/hand brake applications, none of which result in brake switch closure. Such information may be of value to other vehicle operators in evaluating what vehicle control operations and with what urgency these operations should be performed.

SUMMARY

A method for controlling the brake lights of a vehicle includes determining vehicle deceleration potential and modulating brake light activation based upon the vehicle deceleration potential. Modulation may include changing at least one of brake light intensity and flashing of the brake lights.

BRIEF DESCRIPTION OF THE DRAWINGS

One or more embodiments will now be described, by way of example, with reference to the accompanying drawings, in which.

DETAILED DESCRIPTION

Figure 1:
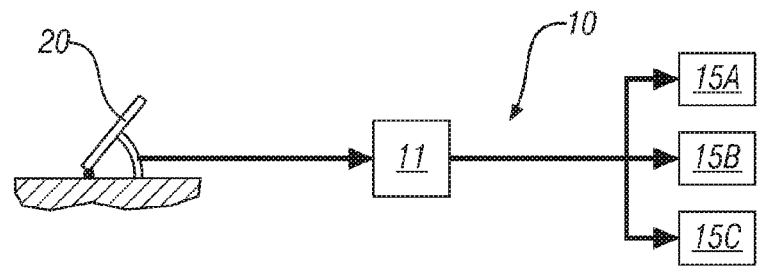
FIG. 1 schematically illustrates a known brake light control configuration in accordance with the present disclosure.

Referring now to the drawings, wherein the showings are for the purpose of illustrating certain exemplary embodiments only and not for the purpose of limiting the same, FIG. 1 illustrates a known brake light control configuration in accordance with the present disclosure. Brake light system 10 comprises a brake light controller 11, brake lights 15A, 15B, and 15C, and brake pedal input 20. Upon receiving an input from brake pedal input 20, brake light controller 11 issues a command or creates an electrical signal directly to illuminate the brake lights 15. Brake lights 15 may take different configurations and are frequently governed by vehicular safety regulations in the country of vehicle sale. Alternative configurations of data input, including the use of vehicle speed or vehicle acceleration may be substituted for brake pedal input as illustrated in FIG. 1.

Figure 2:
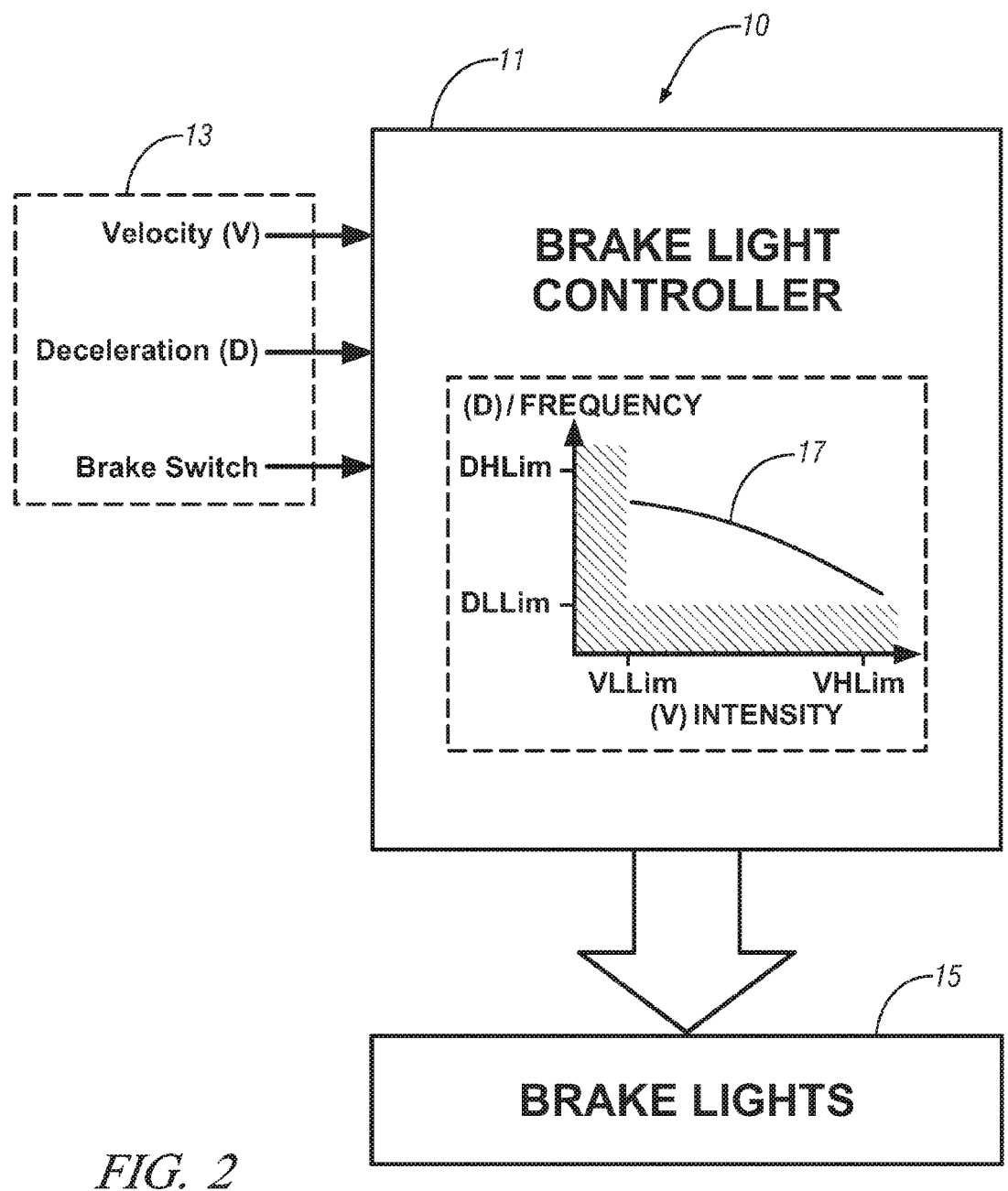
FIG. 2 schematically illustrates an exemplary embodiment of a brake light controller in accordance with the present disclosure.

Referring now to FIG. 2, an exemplary brake light system 10 is schematically illustrated in accordance with the present disclosure. Brake light controller 11 preferably takes the form of general purpose automotive computer based control hardware including, for example, such common elements as a microprocessor, I/O devices, volatile and non-volatile memory devices, high speed clock, etc. A set of resident program instructions stored in non-volatile memory as well as calibration data also stored in non-volatile memory are used in performing the tasks of the brake light controls in accordance with the present disclosure as further described herein below. One having ordinary skill in the art will recognize that the brake light controller may be dedicated to brake light control functions or may also perform other unrelated functions related to other vehicle controls of any of a variety of lighting or other vehicle systems. Also, brake light controller 11 may include a single integrated control module or may include a variety of distributed control modules each performing certain of the tasks related to the brake light controls of the present disclosure and in communication with one another, for example, through any of a variety of data bus or network structures.

Brake light controller 11 receives certain inputs 13 from a variety of sensors, transducers or signals passed from other control modules useful for various brake light control functions including those particularly related to the present disclosure. A number of indicators can be used to judge impending actions to slow or stop the vehicle indicating braking urgency. Indicators may include actions undertaken by the operator, such as brake pedal depression or a change in brake pedal depression, indicating a perceived need to stop or slow the vehicle. Indicators may also include vehicle behaviors, such as deceleration caused by downshifting, collisions, or other actions which can slow or stop a vehicle without brake pedal depression. Indicators may also include reactions by the vehicle stability systems to perceived driving conditions, such as an anti-lock braking system reacting to a vehicle hydro-planing or an anti-skid system responding to an icy patch on the road. Although such driving conditions may neither coincide with a brake pedal depression or the vehicle slowing, such conditions can indicate a proximate likelihood that the vehicle will slow or stop in the very near future. Also, a combination of indicators, while not indicative when viewed in isolation, can be used to forecast braking urgency. In one exemplary embodiment, the urgency of individual indicators could be compared to an overall braking urgency, and brake light control can be accomplished by comparing the various urgencies. Inputs to the brake light controller to monitor these indicators may take many forms. In the present exemplary embodiment, as depicted in FIG. 2, vehicle velocity (V), vehicle deceleration (D) and brake switch inputs are illustrated. Vehicle velocity is a control quantity commonly used in many other vehicle control systems, particularly control systems related to instrumentation, powertrain controls, vehicle braking and stability enhancement systems, etc. Vehicle velocity is preferably derived from one or more speed signals from, for example, a transmission or transaxle output speed sensor or one or more vehicle wheel speed sensors. Vehicle deceleration may be determined, for example, from well known derivative signal processing of the vehicle velocity signal. Alternatively, vehicle deceleration may be provided by an accelerometer such as, for example, may be employed in supplemental inflatable restraint systems or in vehicle stability systems as well known to those having ordinary skill in the art. As mentioned above, vehicle deceleration is frequently indicative of the intensity with which the vehicle operator is applying the brakes. As an alternative to vehicle deceleration, brake pedal pressure may be utilized as an indicator of braking intensity. Additionally, as noted above, inputs from vehicle stability systems can indicate other conditions with implications to vehicle slowing or stopping. Finally, a brake switch as previously described and configured in cooperation with the brake pedal provides another input to brake light controller 11 useful in conventional functions implemented by the brake light controller.

Brake light controller 11, through execution of program instructions, processes the inputs 13, applies various rules, algorithms and calibrations to affect a desired control of the brake lights 15. In one alternative, in accordance with one aspect of the present disclosure, brake light controller 11 receives vehicle deceleration (D) and based upon the deceleration selects a modulation frequency for toggling or flashing the brake lights between two states. The two states may simply be on and off, for example, or may be two different intensity or brightness levels. In the present example, the flashing frequency varies continuously between low and high with a correspondence of low level decelerations to low frequency toggling and high level decelerations to high frequency toggling. In one embodiment, the flashing frequency as well as the duty cycle (i.e. fraction of one state relative to the frequency period) may also vary as a function of deceleration. For example, it may be preferred that a low level deceleration limit (DLLim) is indicated by a relatively long on time and relatively short off time at a relatively low frequency. In contrast, a high level deceleration limit (DHLim) would preferably be indicated by a relatively short on time and relatively short off time at a relatively high frequency. At both deceleration limits, it may be preferred that the off times are equivalent and only the on time changes in accordance with the deceleration thereby resulting in the previously described brake light control. Below the low level deceleration limit, the brake lights may be on constantly. Above the high level deceleration limit, the brake lights may flash with a maximum calibrated frequency. This exemplary brake light control of frequency correspondence to deceleration level is illustrated with reference to the graph which is part of the brake light controller 11 of FIG. 2.

In another alternative, the brake light controller 11 operates to turn the brake lights 15 on without any toggling on and off until a predetermined threshold level of deceleration is reached whereupon the brake light controller 11 will toggle the brake lights 15 between two states. Again, the two states may simply be on and off, for example, or may be two different intensity or brightness levels. In this example, however, there is no continuum of frequency adjustments as a function of deceleration. In other words, the brake light controller operates the brake lights in accordance with conventional functionality until a deceleration of sufficient severity to warrant an additional signal warning following vehicles. The threshold may be a single calibrated value or may vary in accordance with vehicle velocity wherein higher vehicle speeds would result in lower deceleration thresholds. Such a dynamic threshold is represented by exemplary line 17 of the graph which is part of the brake light controller 11 and which represents the general preferred trend of such a threshold with increasing vehicle velocity (V). Many embodiments of implementing a changing flashing pattern within a brake light activation scheme are envisioned, and the disclosure is not intended to be limited to the specific examples given herein.

In accordance with yet another alternative, a second brake light parameter or characteristic may be controllably adapted to convey additional information regarding the decelerating vehicle. For example, brake light intensity or brightness may be modulated as a function of vehicle velocity. In the present example, the intensity of the brake lights varies between low and high with a correspondence of low velocity to low intensity and high velocity to high intensity. In the present example, the intensity varies continuously between low and high with a correspondence of low velocity to low intensity and high velocity to high intensity. In one embodiment, below a low level velocity limit (VLLim), the brake light intensity may be set in accordance with a predetermined minimum. Above a high level velocity limit (VHLim), the brake light intensity may be set in accordance with a predetermined maximum. This exemplary brake light control of intensity correspondence to velocity level is illustrated with reference to the graph which is part of the brake light controller 11 of the schematic figure of the brake light system 10. Brake light intensity may be controlled, for example with pulse width modulation, voltage control or current control to conventional filament-type bulbs or through varying the number of active LEDs in an LED array as another example. Many embodiments of implementing changing brake light intensity within a brake light activation scheme are envisioned, and the disclosure is not intended to be limited to the specific examples given herein.

As a further illustration of a comprehensive brake light control scheme which utilizes both frequency toggling and intensity modulation of brake lights in accordance with deceleration and velocity, respectively, a four quadrant breakdown of general brake light control may be useful. A high velocity coupled with a large deceleration would toggle the brake lights on and off rapidly thus indicating high rates of deceleration and do so with a high level of light intensity thus indication a high vehicle velocity. Similarly, a high velocity coupled with a small deceleration would toggle the brake lights on and off slowly thus indicating low rates of deceleration and do so with a high level of light intensity thus indication a high vehicle velocity. And, a low velocity coupled with a large deceleration would toggle the brake lights on and off rapidly thus indicating high rates of deceleration and do so with a low level of light intensity thus indication a low vehicle velocity. Finally, a low velocity coupled with a small deceleration would toggle the brake lights on and off slowly thus indicating low rates of deceleration and do so with a low level of light intensity thus indication a low vehicle velocity. One having ordinary skill in the art will recognize that less granularity in the information may be conveyed through selection of more than four regions within the velocity and deceleration space as described, providing opportunity for almost infinitesimally fine granularity in the velocity and deceleration information transmittable via the brake light of the vehicle.

Emergency stops can occur in a great number of situations. Frequently, the same conditions that caused a vehicle to stop quickly, such as fog, unexpected stopped traffic on a highway, slippery conditions, etc., can cause additional vehicles to subsequently need to stop. Brake lights are only effective insofar as they convey the presence and condition of the slowed or stopped vehicle to subsequent slowing or stopping vehicles. One method to best alert traffic of an emergency stop is to fix the brake light activation throughout a slowing event at the level of maximum braking experienced within the braking event to convey the seriousness of the situation to subsequent vehicles. Additionally, the brake light signal can be maintained until the vehicle velocity recovers to a normal setting consistent with the emergency stop condition being over. For instance, if a driver has to brake hard to avoid unforeseen stopped traffic and successfully brakes the vehicle in time, a dangerous condition may still exist even though the vehicle braked in time. By maintaining the braking signal activated during the hard braking event until the vehicle is out of danger, a rear end collision can be avoided by the added warning in the brake light signal.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling brake lights of a vehicle, comprising:
   determining vehicle deceleration potential comprising
      monitoring indicators comprising at least two of brake pedal position, change in brake pedal depression, vehicle rate of deceleration, vehicle velocity, and data from a vehicle stability system, and
      calculating said vehicle deceleration potential comprising
         estimating a braking urgency factor for each of said indicators,
         estimating an overall braking urgency factor based on said indicators, and
         tracking a greatest one of said braking urgency factors and said overall braking urgency factor; and,
   modulating brake light activation based upon said determining, said modulating comprising changing at least one of brake light intensity and flashing of said brake lights.

2. The method of claim 1, wherein said flashing of said brake lights comprises oscillating between said brake lights illuminated to a full intensity and said brake lights controlled to a partial intensity.

3. The method of claim 1, wherein said flashing of said brake lights comprises repeating a pattern of changing light intensity.

4. The method of claim 1, wherein said modulating brake light activation comprises said changing of said flashing of said brake lights based upon a vehicle rate of deceleration, wherein changing of said flashing of said brake lights comprises utilizing a maximum flashing frequency when said vehicle rate of deceleration is greater than a high level deceleration limit.

5. Method for controlling brake lights of a vehicle, comprising:
   determining vehicle deceleration potential; and
   modulating brake light activation based upon said determining, said modulating comprising changing at least one of brake light intensity and flashing of said brake lights said changing of said flashing of said brake lights is based upon a vehicle rate of deceleration;
   wherein said changing of said flashing of said brake lights further comprises
      utilizing a maximum flashing frequency when said vehicle rate of deceleration is greater than a high level deceleration limit, and
      utilizing a variable flashing frequency when said vehicle rate of deceleration is less than said high level deceleration limit, wherein said variable flashing frequency coincides with said maximum flashing frequency when said rate of deceleration equals said high level deceleration limit and decreases as said vehicle rate of deceleration decreases.

6. The method of claim 5, wherein said utilizing said variable flashing frequency modulates a period of time said flashing requires to complete a flashing cycle.

7. The method of claim 5, wherein said utilizing said variable flashing frequency modulates a duty cycle of brake light activation within a fixed duration flashing cycle.

8. Method for controlling brake lights of a vehicle, comprising:
   determining vehicle deceleration potential; and
   modulating brake light activation based upon said determining, said modulating comprising changing at least one of brake light intensity and flashing of said brake lights, wherein said changing of said flashing of said brake lights is based upon a vehicle rate of deceleration, wherein changing of said flashing of said brake lights comprises utilizing a maximum flashing frequency when said vehicle rate of deceleration is greater than a high level deceleration limit, and wherein said utilizing said maximum flashing frequency comprises fixing said modulating brake light activation to said maximum flashing frequency until an end to a slowing event occurs.

9. The method of claim 8, wherein said utilizing said maximum flashing frequency further comprises fixing said modulation brake light activation to said maximum flashing frequency until a normalizing gas pedal event occurs.

10. Method for controlling brake lights of a vehicle, comprising:

determining vehicle deceleration potential; and, modulating brake light activation based upon said determining, said modulating comprising changing at least one of brake light intensity and flashing of said brake lights wherein said modulating brake light activation comprises said changing of brake light intensity based upon vehicle velocity, wherein said changing brake light intensity comprises utilizing increased brake light intensity for higher vehicle velocities.

11. The method of claim 10, wherein said changing of brake light intensity further comprises:

utilizing a minimum brake light intensity when said vehicle velocity is below a low level velocity limit; and utilizing a maximum brake light intensity when said vehicle velocity exceeds a high level velocity limit.

12. The method of claim 11, wherein said changing brake light intensity further comprises:

utilizing an increasing-with-velocity brake light intensity when said vehicle velocity is between said low level velocity limit and said high level velocity limit.

13. Method for controlling brake lights of a vehicle, comprising:

determining vehicle deceleration potential; and modulating brake light activation based upon said determining, said modulating comprising changing at least one of brake light intensity and flashing of said brake lights, wherein said modulating brake light activation comprises:

said changing of said flashing of said brake lights based upon a rate of deceleration, wherein said changing of said flashing of said brake lights comprises utilizing a maximum flashing frequency when said rate of deceleration exceeds a high level deceleration limit; and said changing of brake light intensity based upon vehicle velocity, wherein said changing of brake light intensity comprises utilizing increased brake light intensity for higher vehicle velocities.

14. Method for rear end collision avoidance by modulation of brake light activation, comprising:

monitoring a vehicle rate of deceleration;

monitoring a vehicle velocity;

modulating brake light activation by changing brake light intensity based upon vehicle velocity, wherein said changing brake light intensity comprises utilizing increased brake light intensity as said vehicle velocity increases; and modulating brake light activation by flashing of brake lights based upon said vehicle rate of deceleration, wherein said flashing of said brake lights comprises utilizing a maximum flashing frequency when said rate of deceleration is greater than a high level deceleration limit.

15. The method of claim 14, wherein said flashing of said brake lights further comprises utilizing a variable flashing frequency when said vehicle rate of deceleration is less than said high level deceleration limit, wherein said variable flashing frequency decreases as said vehicle rate of deceleration decreases.

16. Apparatus for controlling brake light activation, comprising:

brake lights mounted on a vehicle; and a brake light controller monitoring a vehicle velocity and a vehicle rate of deceleration and controlling activation of said brake lights based upon said vehicle velocity and said vehicle rate of deceleration;

wherein said brake light activation comprises flashing said brake lights based upon said vehicle deceleration and changing brake light intensity based upon said vehicle velocity.

17. The apparatus of claim 16, wherein said activation further comprises:

increasing a rate of flashing said brake lights as said vehicle rate of deceleration increases;

when said vehicle velocity is less than a low level velocity limit, utilizing a minimum brake light intensity;

when said vehicle velocity exceeds a high level velocity limit, utilizing a maximum brake light intensity; and when said vehicle velocity is between said low level velocity limit and said high level velocity limit, utilizing an increasing-with-velocity brake light intensity.

* * * * *